US011053861B2

(12) United States Patent
Moster et al.

(10) Patent No.: US 11,053,861 B2
(45) Date of Patent: Jul. 6, 2021

(54) OVERSPEED PROTECTION SYSTEM AND METHOD (71) Applicant: General Electric Company, Schenectady, NY (US)

(72) Inventors: David Anthony Moster, Liberty Township, OH (US); William James Mailander, Beverly, MA (US); David Allen Gutz, Wenham, MA (US)

(73) Assignee: General Electric Company, Schenectady, NY (US)

( * ) Notice: Subject to any disclaimer, the term of this patent is extended or adjusted under 35 U.S.C. 154(b) by 687 days.

(21) Appl. No.: 15/059,378

(22) Filed: Mar. 3, 2016

(65) Prior Publication Data
US 2017/0254295 A1 Sep. 7, 2017

(51) Int. Cl.
F02C 9/00 (2006.01)
F01L 21/02 (2006.01)
F02C 9/46 (2006.01)
F02C 9/50 (2006.01)
F02C 7/232 (2006.01)

(52) U.S. Cl.
CPC ............... F02C 9/00 (2013.01); F01L 21/02 (2013.01); F02C 7/232 (2013.01); F02C 9/46 (2013.01); F02C 9/50 (2013.01)

(58) Field of Classification Search
CPC .... F01D 21/02; F02C 9/46; F02C 9/50; F02C 7/042; F02C 9/54; F02C 7/232; F01K 1/17; F01K 1/18
See application file for complete search history.

(56) References Cited

U.S. PATENT DOCUMENTS

| 3,266,248 | A | | 8/1966 | Leslie | |
|---|---|---|---|---|---|
| 3,874,170 | A | * | 4/1975 | Lewis | F02C 7/232 60/241 |
| 4,229,937 | A | * | 10/1980 | Smith | F02C 7/232 251/29 |
| 4,578,945 | A | * | 4/1986 | Peck | F02C 9/26 60/39.281 |
| 4,611,621 | A | * | 9/1986 | Miyakawa | F01M 1/16 137/115.23 |
| 4,718,229 | A | | 1/1988 | Riley | |
| 4,810,164 | A | * | 3/1989 | Wright | F01D 7/00 415/129 |
| 5,177,951 | A | * | 1/1993 | Butler | F02C 7/14 60/772 |
| 5,439,353 | A | | 8/1995 | Cook et al. | |
| 5,440,490 | A | | 8/1995 | Summerfield | |

(Continued)

FOREIGN PATENT DOCUMENTS

WO WO2009/020416 A1 2/2009

Primary Examiner — Katheryn A Malatek
(74) Attorney, Agent, or Firm — Dority & Manning, P.A.

(57) ABSTRACT

In accordance with one exemplary embodiment of the present disclosure, a method for providing overspeed protection for a gas turbine engine is provided. The gas turbine engine may include an engine core and an engine shaft. The method may include determining an overspeed condition of the engine. The overspeed condition may be indicative of an above normal rotational speed of the engine shaft. The method may also include reducing an airflow through the engine core of the gas turbine engine in response to the determined overspeed condition to reduce the rotational speed of the engine shaft.

12 Claims, 8 Drawing Sheets

74 - FLUID PUMP
76 - GUIDE VANE VALVE
78 - OUTLET GUIDE VANE (OGV) VALVE
80 - SECONDARY GUIDE VANE (SGV) VALVE
82 - BYPASS VALVE
84 - FUEL METERING VALVE (FMV)
86 - HIGH-PRESSURE SHUT OFF VALVE (HPSOV)
88 - FMV POSITIONAL VALVE
90 - HPSOV POSITIONAL VALVE
94 - OVER SPEED (OS) POSITIONAL VALVE
96 - SPOOL VALVE
100 - CONTROLLER

(56) References Cited

U.S. PATENT DOCUMENTS

| | | | |
|---|---|---|---|
| 5,715,674 A * | 2/1998 | Reuter | F02C 7/232 60/39.281 |
| 5,965,240 A | 10/1999 | Blackburn et al. | |
| 6,132,857 A | 10/2000 | Champenois et al. | |
| 6,135,135 A * | 10/2000 | Futa, Jr. | F02C 7/232 137/115.03 |
| 6,176,074 B1 | 1/2001 | Thompson et al. | |
| 6,385,959 B1 * | 5/2002 | Montoya | F02C 3/13 60/39.15 |
| 6,568,166 B2 | 5/2003 | Jay et al. | |
| 6,745,572 B2 | 6/2004 | Jay et al. | |
| 6,827,548 B2 | 12/2004 | Coxhead et al. | |
| 6,915,639 B1 | 7/2005 | Linebrink | |
| 7,424,360 B1 * | 9/2008 | Munson, Jr. | F02C 9/18 340/439 |
| 7,510,778 B2 | 3/2009 | Bernard et al. | |
| 7,736,130 B2 | 6/2010 | Schilling et al. | |
| 7,744,346 B2 | 6/2010 | Schreiber et al. | |
| 7,780,410 B2 | 8/2010 | Kray et al. | |
| 7,780,420 B1 | 8/2010 | Matheny | |
| 7,805,839 B2 | 10/2010 | Cammer | |
| 8,137,073 B2 | 3/2012 | Giusti et al. | |
| 8,662,834 B2 | 3/2014 | Kray et al. | |
| 8,851,421 B2 | 10/2014 | Jevons et al. | |
| 8,851,855 B2 | 10/2014 | James et al. | |
| 8,979,500 B2 | 3/2015 | Northfield | |
| 9,157,327 B2 | 10/2015 | Deal et al. | |
| 2008/0253922 A1 | 10/2008 | Trimmer et al. | |
| 2008/0264067 A1 * | 10/2008 | Flucker | F04D 27/0246 60/793 |
| 2008/0289338 A1 * | 11/2008 | Desai | F02C 7/232 60/734 |
| 2009/0320937 A1 * | 12/2009 | Arnett | G05D 16/166 137/535 |
| 2010/0037961 A1 * | 2/2010 | Tysver | G05D 7/0688 137/115.13 |
| 2011/0182741 A1 | 7/2011 | Alexander | |
| 2011/0229334 A1 | 9/2011 | Alexander | |
| 2012/0301292 A1 | 11/2012 | Deal et al. | |
| 2014/0205472 A1 * | 7/2014 | Hutto, Jr. | F04B 25/00 417/244 |

* cited by examiner

FIG. 1

74 – FLUID PUMP
76 – GUIDE VANE VALVE
78 – OUTLET GUIDE VANE (OGV) VALVE
80 – SECONDARY GUIDE VANE (SGV) VALVE
82 – BYPASS VALVE
84 – FUEL METERING VALVE (FMV)
86 – HIGH-PRESSURE SHUT OFF VALVE (HPSOV)
88 – FMV POSITIONAL VALVE
90 – HPSOV POSITIONAL VALVE
94 – OVER SPEED (OS) POSITIONAL VALVE
96 – SPOOL VALVE
100 – CONTROLLER

74 – FLUID PUMP
76 – GUIDE VANE VALVE
78 – OUTLET GUIDE VANE (OGV) VALVE
80 – SECONDARY GUIDE VANE (SGV) VALVE
82 – BYPASS VALVE
84 – FUEL METERING VALVE (FMV)
86 – HIGH-PRESSURE SHUT OFF VALVE (HPSOV)
88 – FMV POSITIONAL VALVE
90 – HPSOV POSITIONAL VALVE
94 – OVER SPEED (OS) POSITIONAL VALVE
96 – SPOOL VALVE
100 – CONTROLLER

74 – FLUID PUMP
76 – GUIDE VANE VALVE
78 – OUTLET GUIDE VANE (OGV) VALVE
80 – SECONDARY GUIDE VANE (SGV) VALVE
82 – BYPASS VALVE
84 – FUEL METERING VALVE (FMV)
86 – HIGH-PRESSURE SHUT OFF VALVE (HPSOV)
88 – FMV POSITIONAL VALVE
90 – HPSOV POSITIONAL VALVE
100 – CONTROLLER

OVERSPEED PROTECTION SYSTEM AND METHOD

FIELD OF THE INVENTION

The present subject matter relates generally to a gas turbine engine, and more particularly, to overspeed protection of a gas turbine engine shaft.

BACKGROUND OF THE INVENTION

Gas turbine engines often include overspeed protection systems that provide overspeed protection. Several factors could lead to the result of an engine overspeed, such as control failure or mechanical failure, e.g., a sheared shaft in a turboprop application. In the case of a failed shaft, the loss of resistance to torque may cause the shaft to subsequently overspeed. Such overspeeding may cause increased damage due to failure of turbine blades or rotor and the possibility of destruction of the engine. As a result, there is a danger that greater damage to the engine will occur if an overspeed is left unchecked.

Some existing overspeed protection systems attempt to limit rotor speed by cutting off fuel to the engine. This has been done in both electronic and hydromechanical fashion, wherein the fuel metering valve is closed and/or a bypass valve is opened up, preventing the additional flow of fuel to the engine when an overspeed event is detected. However, such measures may be insufficient to prevent destructive overspeed events. Many modern engines are able to generate greater amounts of energy without significantly increasing the overall engine mass. This may result in the need for more aggressive actions to prevent destructive overspeed events.

Accordingly, improved overspeed protection systems are desired. A turbine engine response mechanism to aid in elimination of the energy contributed to the overspeed due to the airflow through the compressor would be advantageous. For instance, such mechanisms may significantly reduce the total amount of energy contributing to the overspeed event. Furthermore, it would be desirable to provide these advantages without impacting overall weight and efficiency of the engine.

BRIEF DESCRIPTION OF THE INVENTION

Aspects and advantages of the invention will be set forth in part in the following description, or may be obvious from the description, or may be learned through practice of the invention.

accordance with one exemplary embodiment of the present disclosure, a method for providing overspeed protection for a gas turbine engine is provided. The gas turbine engine may include an engine core and an engine shaft. The method may include determining an overspeed condition of the engine. The overspeed condition may be indicative of an above normal rotational speed of the engine shaft. The method may also include reducing an airflow through the engine core of the gas turbine engine in response to the determined overspeed condition to reduce the rotational speed of the engine shaft.

In accordance with another exemplary embodiment of the present disclosure, a method for providing overspeed protection for a gas turbine engine is provided. The gas turbine engine may include an engine shaft, a combustion section, and a variable geometry component, the variable geometry component including an actuator. The method may include determining an overspeed condition of the engine shaft. The method may also include restricting a fuel flow from the combustion section of the gas turbine engine in response to the overspeed condition. The method may further include directing the fuel flow to the actuator of the variable geometry component in response to the determined overspeed condition. The method may additionally include positioning the variable geometry component in an airflow inhibiting position with the actuator to reduce a rotational speed of the engine shaft.

In accordance with yet another exemplary embodiment of the present disclosure, an overspeed protection system for a gas turbine engine is provided. The gas turbine engine may define a flowpath and a central axis while including a combustion section and an engine shaft. The overspeed protection system may include a variable geometry component, an actuator, a control circuit, and a controller. The variable geometry component may be provided for positioning in the flowpath radially outward from the central axis of the gas turbine engine. The actuator may be in operable communication with the variable geometry component for moving the variable geometry component. The control circuit may be in fluid communication with the actuator. The control circuit may include an overspeed valve selectively positionable in a routine state and an overspeed state. The control circuit may define a fuel path to the combustion section of the gas turbine engine in the routine state, and a fuel path to the actuator in the overspeed state. The controller may be in operable communication with the overspeed valve and the engine shaft. The controller may be configured for determining an overspeed condition based at least in part on information received from the engine shaft. The controller may be further configured for positioning the overspeed valve in the overspeed state in response to determining the overspeed condition.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Generally, in at least some embodiments, an overspeed protection system will react to detection or determination of an overspeed condition within a gas turbine engine. As used herein, "overspeed condition" will be understood to indicate a state within the gas turbine engine that might cause an engine shaft to rotate at an above-average or above-normal velocity (e.g., an engine shaft break). In response to the overspeed condition, flow of the fuel to the engine may be stopped and rerouted to a movable component within the engine. Instead of combusting within the engine, the fuel may be used to rotate or otherwise move the component to a position that substantially blocks or substantially reduces a flow of air into the engine. With a reduced amount of air flowing through the engine, the amount of energy delivered to the turbine is reduced, therefore reducing the peak turbine overspeeds.

Figure 1:
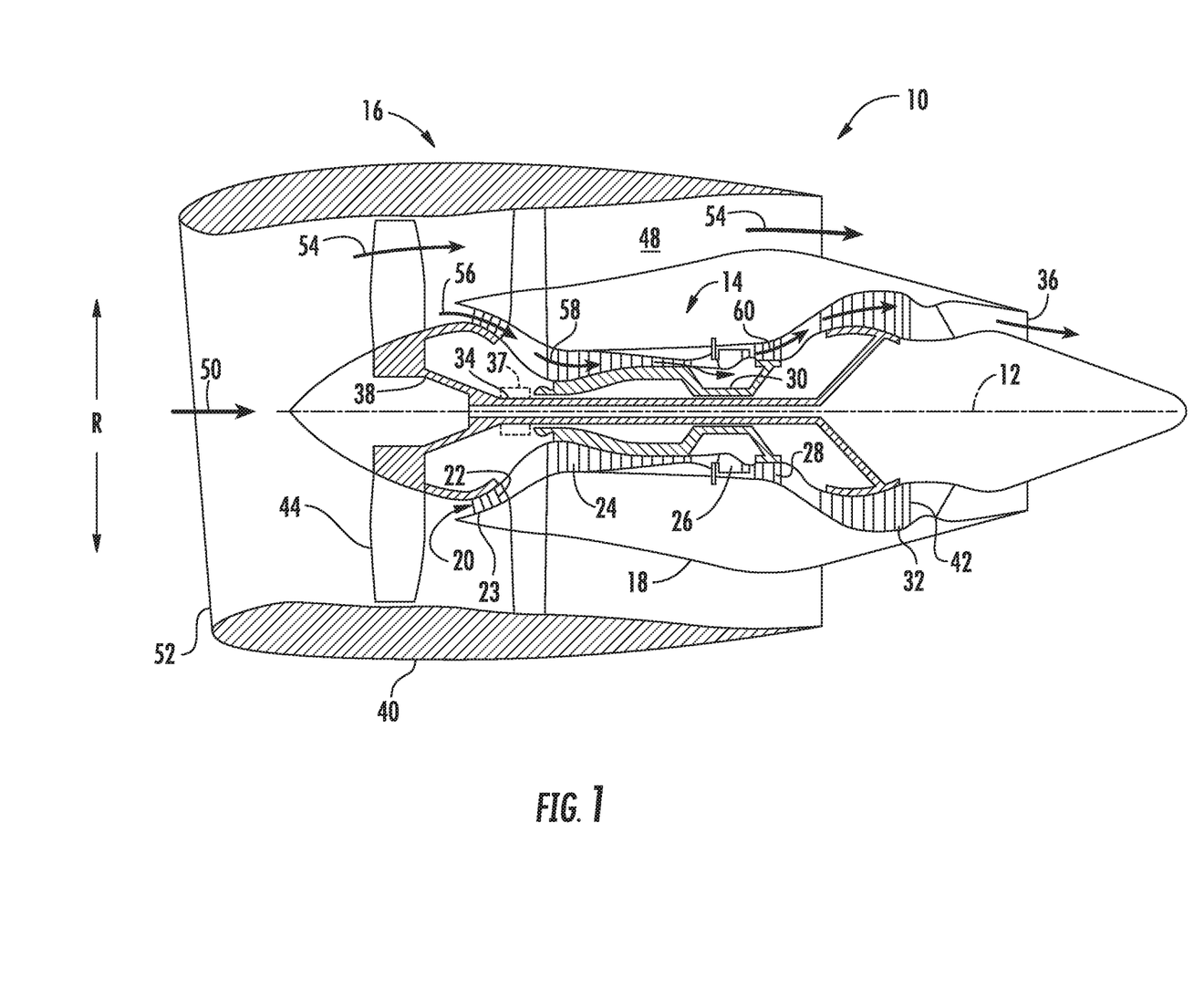
FIG. 1 provides a cross-sectional schematic view of an exemplary gas turbine engine in accordance with one or more embodiments of the present disclosure.

Turning now to the figures, FIG. 1 is a schematic cross-sectional view of an exemplary high-bypass turbofan type engine 10. The turbofan engine 10 may be utilized within an aircraft in accordance with aspects of the present subject matter, with the engine 10 being shown having a longitudinal or axial centerline axis 12 extending therethrough for reference purposes. The engine 10 includes a core gas turbine engine 14 and a fan section 16 positioned upstream thereof. The core engine 14 of the shown embodiment includes a substantially tubular outer casing 18 that defines an annular inlet 20. The outer casing 18 further encloses and supports a low pressure (LP) compressor 22 for increasing the pressure of the air that enters the core engine 14 to a first pressure level. A multi-stage high pressure (HP) compressor 24 subsequently receives the pressurized air from the LP compressor 22 and further increase the pressure of the received air. The pressurized air exiting the HP compressor 24 may then flow to a combustion section 26 within which fuel is injected into the flow of pressurized air. The resulting mixture is combusted within the combustion section 26. The high energy combustion products are directed from the combustion section 26 along a hot gas flowpath of the engine 10 to an HP turbine 28, the HP turbine driving the HP compressor 24 via an HP drive shaft 30. After the high energy combustion products are directed from the HP turbine 28, they may be further directed to an LP turbine 32, the LP turbine 32 driving the LP compressor 22 and fan section 16 via an LP drive shaft 34 that is generally coaxial with HP drive shaft 30. After driving each of turbines 28 and 32, the combustion products may be expelled from the core engine 14 via an exhaust nozzle 36 to provide propulsive jet thrust.

A plurality of inlet guide vanes 23 is positioned at the annular inlet 20 of the LP compressor 22. Generally, the inlet guide vanes 23 are disposed in an annular array about the centerline axis 12. The vanes 23 may be configured as variable geometry components, which may alter at least a portion of the geometry for the gas turbine engine 10. In certain embodiments, each inlet guide vane 23 may be configured as a variable geometry component and define a respective pitch axis about which it is rotatable by an actuator (not shown). Rotating the inlet guide vanes 23 about their respective pitch axes may direct a flow of air through the engine core 14 and/or reduce an amount of airflow through the core turbine engine, as discussed below. Similarly, it should be appreciated that each turbine 28, 30 may generally include one or more turbine stages, with each stage including a plurality of guide vanes disposed in an annular array about the centerline axis 12 of the engine 10 for directing the flow of combustion products through the turbine stage towards a corresponding annular array of rotor blades forming part of the turbine rotor. As is generally understood, the inlet guide vanes 23 and/or rotor blades may be coupled to a rotor disk of a respective turbine rotor, which is, in turn, coupled to the engine's drive shaft (e.g., drive shaft 30 or 34).

Additionally, as shown in FIG. 1, the fan section 16 of the engine 10 includes a rotatable, axial-flow fan rotor 38 that is configured to be surrounded by an annular fan casing 40. For the exemplary embodiments depicted, the LP drive shaft 34 is connected directly to the fan rotor 38, such as in a direct-drive configuration. In alternative configurations, however, the LP drive shaft 34 may be connected to the fan rotor 38 via a speed reduction device 37 such as a reduction gear gearbox in an indirect-drive or geared-drive configuration. Such speed reduction devices may be included between any suitable shafts/spools within engine 10 as desired or required.

The fan casing 40 may be configured to be supported relative to the core engine 14 by a plurality of substantially radially-extending, circumferentially-spaced outlet guide vanes 42. As such, the fan casing 40 encloses the fan rotor 38 and its corresponding fan rotor blades 44. Moreover, a downstream section 46 of the fan casing 40 extends over an outer portion of the core engine 14 so as to define a secondary, or by-pass, airflow conduit 48 that provides additional propulsive jet thrust. Similar to the above-described inlet guide vanes 23, the fan rotor blades 44 may be configured as variable geometry components capable of varying blade pitch according to one or more desired airflow characteristics.

During normal or routine operation of the engine 10, it should be appreciated that an initial airflow (indicated by arrow 50) may enter the engine 10 through an associated inlet 52 of the fan casing 40. The airflow 50 then passes through the fan blades 44 and splits into a first compressed airflow (indicated by arrow 54) that moves in a flowpath through conduit 48 and a second compressed airflow (indicated by arrow 56) which enters a flowpath of the LP compressor 22. The pressure of the second compressed airflow 56 is then increased and enters the HP compressor 24 (as indicated by arrow 58). After mixing with fuel and being combusted within the combustion section 26, the combustion products 60 exit the combustion section 26 and flow through the HP turbine 28. Thereafter, the combustion products 60 flow through the LP turbine 32 and exit the exhaust nozzle 36 to provide thrust for the engine 10.

It should be appreciated that the exemplary turbofan engine 10 depicted in FIG. 1 is provided by way of example only. In other exemplary embodiments, the engine 10 may have any other suitable configuration. For example, in certain exemplary embodiments, the engine 10 may not include the LP compressor 22, and thus, the LP turbine 30 may only support rotation of the LP spool 36 to provide rotational power to the fan section 16. Additionally, the engine 10 may include various actuators, guide vanes, ports, etc. not described herein or depicted in FIG. 1. Further, in still other exemplary embodiments, the engine 10 may instead be configured as any other suitable gas turbine engine. For example, in other exemplary embodiments, aspects of the present disclosure may be used in conjunction with, e.g., a turboshaft engine, turboprop engine, turbocore engine, turbojet engine, etc.

Figure 2:
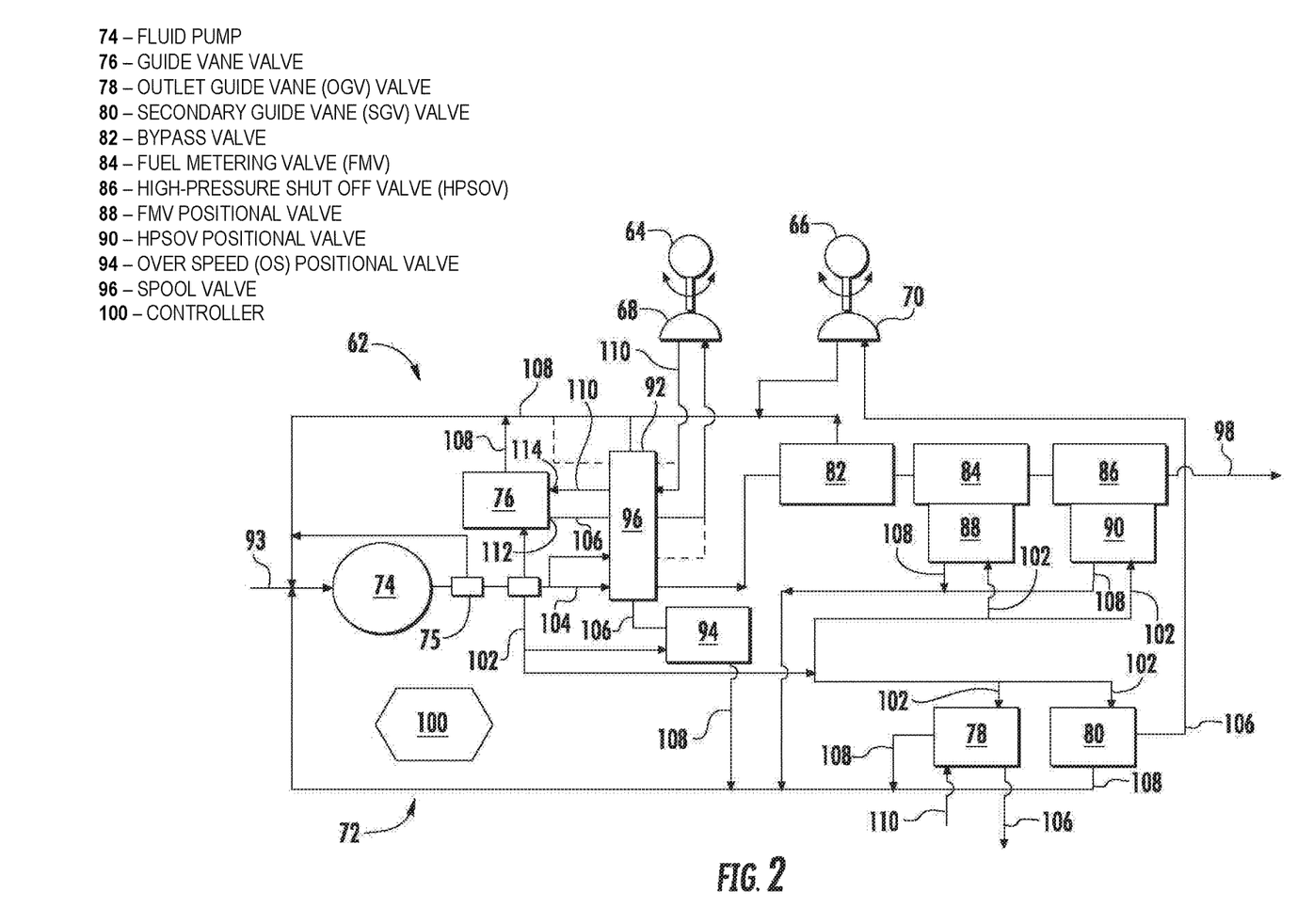
FIG. 2 provides a schematic flow diagram view of an exemplary overspeed protection system in a routine state in accordance with one or more embodiments of the present disclosure.
Figure 3:
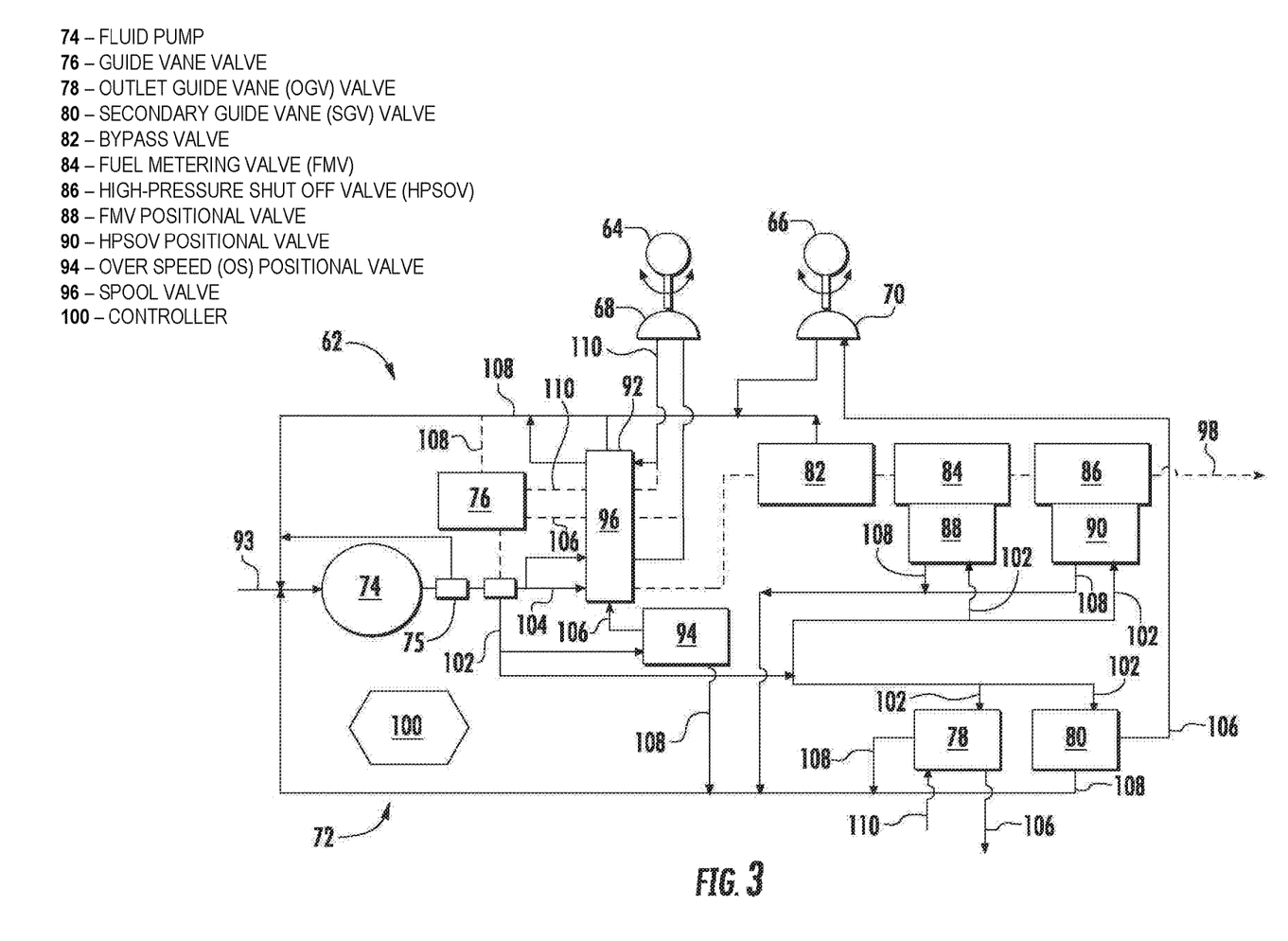
FIG. 3 provides a schematic flow diagram view of the exemplary overspeed protection system of FIG. 2 in an overspeed state.

Turning to FIGS. 2 and 3, schematic flow diagram views are provided illustrating an overspeed protection system 62 according to exemplary embodiments of the present disclosure. The system 62 may be incorporated into, e.g., the exemplary turbofan engine 10 of FIG. 1. Accordingly, the same or similar numbers may refer to the same or similar parts.

As shown, the overspeed protection system 62 is operably connected with a plurality of variable geometry components, including guide vanes 64, 66. Certain embodiments include multiple discrete stage guide vanes, including a primary stage vane 64 and a secondary stage vane 66. Generally, the guide vanes 64, 66 may be positioned radially outward from the central axis 12 (see FIG. 1) for directing airflow through the engine 10. The primary stage vane 64 may be embodied by an inlet guide vane 23 or fan rotor blade 44 (see FIG. 1), while the secondary stage vane 66 may include a subsequent stage vane of the compressors 22, 24 or turbines 28, 32 (see FIG. 1). Although a single primary stage vane 64 and secondary stage vane 66 are shown, each vane shown on FIG. 2 may correspond to an entire stage of nozzles or vanes, as described above. In addition, although one secondary stage vane 66 is shown, other embodiments may include multiple additional stages of vanes corresponding to various variable geometry components, such as various variable pitch compressor or turbine stages. As illustrated, an actuator 68, 70 for each guide vane 64 or 66 may be provided to rotate the guide vane 64 or 66 about a respective pitch axis and/or secure the radial pitch thereof. In the illustrated embodiments, each actuator 68, 70 is configured as a rotary or linear actuator to rotate the guide vanes 64, 66.

As shown, the overspeed protection system 62 includes a control circuit 72 in fluid communication with the guide vanes 64, 66. Generally, the control circuit 72 may include multiple conduits or pipes (as indicated by solid or long-dash lines) directing a hydraulic fluid in order to determine radial rotation or pitch of each guide vane 64, 66. Generally, solid lines are understood to indicate a pipe or conduit enclosing a potential fluid flow, i.e., open; and long-dash lines are understood to indicate a pipe or conduit through which fluid is substantially prevented from flowing, i.e., closed. A fluid pump 74 is provided to circulate the hydraulic fluid through the control circuit 72. Multiple valves are provided to selectively direct the flow of the hydraulic fluid. For instance, in some embodiments, a guide vane valve 76 is provided in fluid communication with the actuator 68 of the primary stage vane 64 to direct routine pitch angle positioning of the primary stage vane 64. The primary guide vane (PGV) valve 76 may include a positional valve to regulate the fluid flow through the PGV valve 76 (e.g., an electronic control valve, electrohydraulic servo valve, or proportional valve). Similarly, an outlet guide vane (OGV) valve 78 and secondary guide vane (SGV) valve 80 may each be included as separate positional valves fluid communication with the outlet guide vane (not pictured) and secondary stage rotary actuator 70, respectively.

The hydraulic fluid of some embodiments includes fluid fuel for use within the combustion section 26 of the engine 10 (see FIG. 1). In some such embodiments, the pump 74 includes an engine pump that continuously circulates fuel through the control circuit 72. One or more fuel governing valves 82, 84, 86 are provided in fluid communication between the pump 74 and the combustion section 26 (see FIG. 1) through a combustion line 98 to regulate the flow of fuel to the combustion section 26 during routine operation. For instance, a bypass valve 82 is included in some embodiments for directing one portion of fuel to the combustion line 98 and another portion of fuel to cycle back to the pump 74. Moreover, a fuel metering valve 84 and a high-pressure shut off valve 86 are optionally provided for metering or shutting off the flow of fuel to the combustion line 98. One or more of the fluid governing valves may include a positional valve (e.g., an electronic control valve, electrohydraulic servo valve, or proportional valve) to regulate the flow (e.g., flowrate and/or flow pressure) of fuel through a respective fuel governing valve. In the exemplary embodiments of FIGS. 2 and 3, the fuel metering valve 84 includes a fuel metering valve (FMV) positional valve 88 and the high-pressure shut off valve 86 includes a high-pressure shut off valve (HPSOV) positional valve 90.

As shown in FIGS. 2 and 3, the embodiment depicted includes an overspeed valve 92 positioned in fluid communication with the guide vane valve 76 and the actuator 68 of the primary stage vane 64. Accordingly, the overspeed valve 92 may regulate or restrict fluid flow to and from the actuator 68. The overspeed valve 92 may be configured to selectively alternate between a routine state and an overspeed state according to one or more inputs. Generally, the routine state may be assumed during normal or non-overspeed conditions, while the overspeed state may be assumed upon determination of an overspeed condition. Certain embodiments of the overspeed valve 92 may include an over speed (OS) positional valve 94 to toggle the state of the valve 92. Optionally, the OS positional valve 94 may include an electronic control valve, electrohydraulic servo valve, or proportional valve. In some embodiments, the OS positional valve 94 is further in operable communication with a controller 100 through a wired communication bus (not shown) or through one or more wireless communications networks. The controller 100 may be configured to control the selective position of the OS positional valve 94. For instance, in the exemplary embodiments of FIGS. 2 and 3, the controller 100 is electronically linked to multiple positional valves (e.g., 76, 78, 80, 88, 90 and/or 94), and is configured to independently control the operational position thereof.

In some embodiments, the controller 100 includes a discrete processor and memory unit (not pictured). Optionally, the controller 100 may include a full authority digital engine control (FADEC), or another suitable engine control unit. Moreover, the controller 100 may be configured to detect or determine an overspeed condition, such as that caused by a break in an engine shaft (e.g., LP drive shaft 34 and/or HP drive shaft 30), at a core engine 14 (see FIG. 1) using one or more suitable sensors. The processor may include a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. The processor may also include a microprocessor, or a combination of the aforementioned devices (e.g., a combination of a DSP and a microprocessor, a plurality of microprocessors, one or more microprocessors in conjunction with a DSP core, or any other such configuration).

Additionally, the memory device(s) may generally comprise memory element(s) including, but not limited to, computer readable medium (e.g., random access memory (RAM)), computer readable non-volatile medium (e.g., a flash memory, EEPROM, NVRAM or FRAM), a compact disc-read only memory (CD-ROM), a magneto-optical disk (MOD), a digital versatile disc (DVD), and/or other suitable memory elements. The memory can store information accessible by processor(s), including instructions that can be executed by processor(s). For example, the instructions can be software or any set of instructions that when executed by the processor(s), cause the processor(s) to perform operations. For certain embodiments, the instructions include a software package configured to operate the system to, e.g., execute the exemplary methods (200) and/or (300) described below with reference to FIGS. 7 and 8.

Returning particularly to FIG. 2, an exemplary overspeed protection system 62 is illustrated in a possible routine state. A spool valve 96 is included as an overspeed valve 92. Generally, fuel is provided as a hydraulic fluid through an incoming line 93 from a fuel reservoir (not pictured). During operation, fuel flows to and from a circulating pump 74 before splitting into multiple select lines, including separate low-pass input lines 102 having a relatively low flow rate to the PGV valve 76, OGV valve 78, SGV valve 80, FMV positional valve 88, HPSOV positional valve 90, and OS positional valve 94. Fuel also flows from the pump 74 to a high-pass input line 104 having a relatively high flow rate and positioned between the pump 74 and the spool valve 96.

As the pump 74 circulates fluid, fuel from the low-pass input lines 102 is regulated through positional valves 76, 78, 80, 88, 90, 94 as pressure input, before exiting each positional valve 76, 78, 80, 88, 90, 94 through at least one actuator signal line 106 (not pictured for 88 and 90). After exiting the actuator signal line 106, fuel may motivate or actuate a corresponding valve or component before flowing to a system return line 108. For some positional valves (e.g., the PGV valve 76), fuel from the actuator signal line 106 returns to the positional valve 76 via an actuator return line 110 before flowing through the system return line 108 to the circulating pump 74. Generally, the positional valves 76, 78, 80, 88, 90, 94 may include suitable inlets and outlets to direct fuel to flow adjacent valves or lines. For instance, in the illustrated embodiment of FIG. 2, the PGV valve 76 defines a pitch-control outlet 112 upstream from the spool valve 96 and a pitch-control inlet 114 downstream from the spool valve 96. During routine operation, fuel will selectively flow through the PGV valve 76 and from the pitch control outlet 112 before entering the spool valve 96 en route to the primary guide actuator 68.

In certain embodiments, fuel flowing through the actuator signal line 106 of the PGV valve 76 must pass through a portion of the spool valve 96 before engaging the actuator 68 of the primary stage vane 64. Similarly, at the routine stage, fuel flowing through the actuator return line 110 from the actuator 68 must pass through a portion of the spool valve 96 before flowing through the system return line 108 of the PGV valve 76. Upon exiting the actuator 68, fuel may reenter the pitch control inlet 114 from the spool valve 96.

In the routine state of FIG. 2, fuel flowing from the high-pass input line 104 passes through the spool valve 96 before being directed to the fuel governing valves 84, 86, 88. Specifically, the high-pass input line 104 extends to the bypass valve 82 through the spool valve 96. Within the bypass valve 82, a portion of the high-pass fluid flow is immediately directed to a system return line 108. The remaining portion of the fuel is forced through the flow metering valve 84 and high-pressure shut off valve 86 before exiting the control circuit 72 via the combustion line 98 to the combustion section 26 (see FIG. 1).

Figure 4:
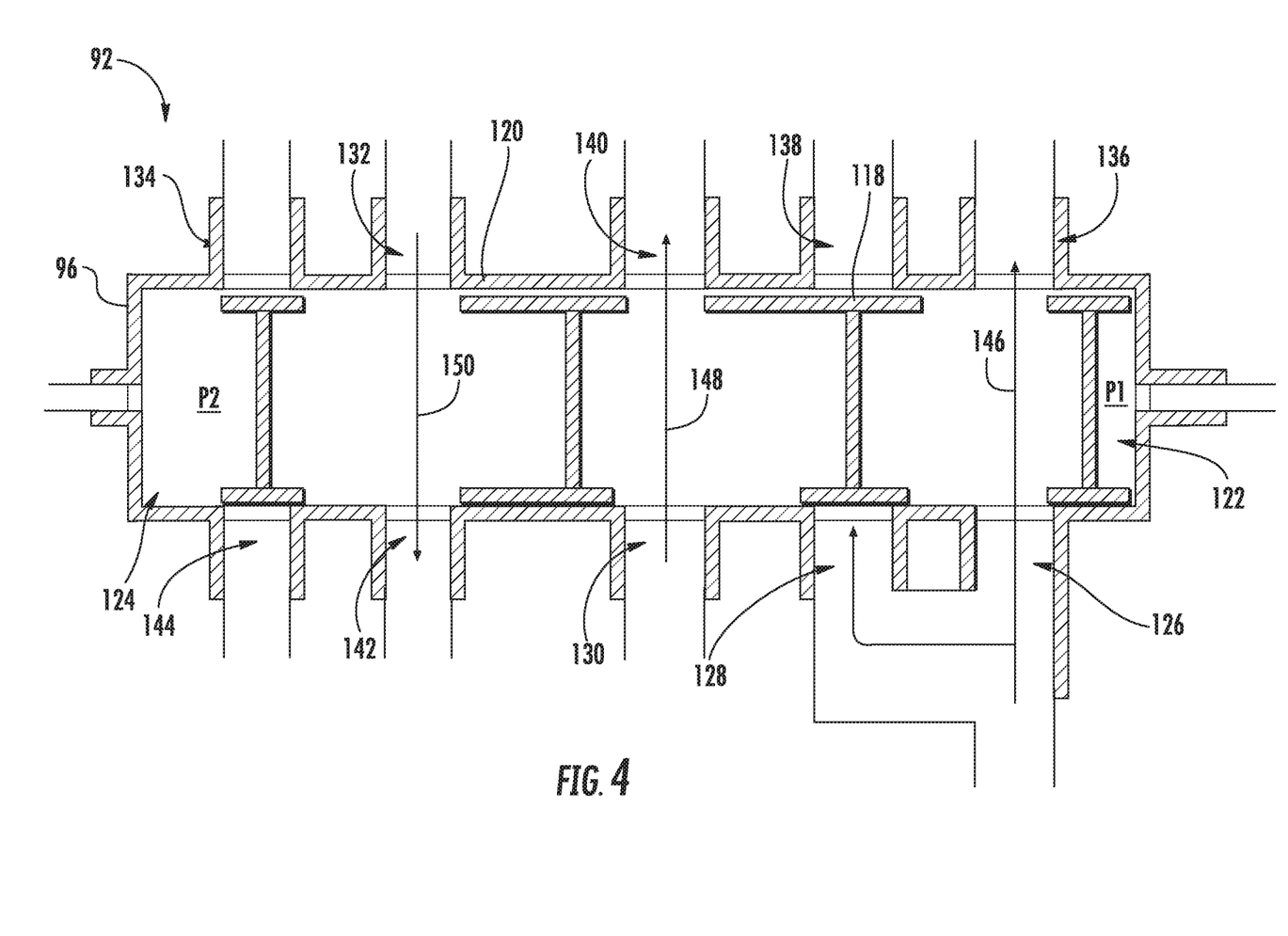
FIG. 4 provides a cross-sectional schematic view of an exemplary overspeed valve in a routine state in accordance with one or more embodiments of the present disclosure.

FIG. 4 provides an exemplary cross-sectional view of the spool valve 96 at a routine state. As illustrated, the spool valve 96 includes a spool 118 slidably disposed within a valve casing 120. When assembled, the spool 118 defines a plurality of passages within the casing 120. Together, the spool 118 and casing 120 define at least two positional chambers 122, 124 disposed at opposite ends between which the spool 118 may move. A routine-state drive pressure P1 is supplied to first chamber 122 from the OS positional valve 94 (see FIG. 2) while a corresponding routine-state response pressure P2 is reached in the second chamber 124. In the illustrated embodiment, an equalizing line in fluid communication with a system return line 108 (see FIG. 2) allows fluid communication therebetween. In certain embodiments, the second chamber 124 may include a biasing member (e.g., spring) to provide a predetermined response force or pressure in reaction to pressure from the OS positional valve 94. In some such embodiments, the second chamber 124 may be configured as a sealed cavity wherein the biasing member includes a compressible fluid within the second chamber 124.

As shown, the casing 120 may define a plurality of fluid ports. In the illustrated embodiment, two high-pass ingress ports 126, 128 receive fuel from the high-pass input line 104 (see FIG. 2); while a low-pass ingress port 130 receives fuel from the actuator signal line 106 of the PGV valve 76 (see FIG. 2). Two inbound return ports 132, 134 are in selective fluid communication with the actuator return line 110 of the primary stage rotary actuator 68 (see FIG. 2). Generally, a first egress port 136 may direct fuel to the bypass valve 82 (see FIG. 2), while a second egress port 138 and a third egress port 140 selectively direct fuel to the primary stage vane 64 (see FIG. 2). One outbound return port 142 is configured in direct fluid communication with the PGV valve 76, and a second outbound return port 144 is configured in direct fluid communication with a system return line 108.

In the example routine state of FIG. 4, the casing 120 and spool 118 define multiple paths through the spool valve 96. A first fuel path 146 extends from the first high-pass ingress port 126 to the first egress port 136 to direct fuel to the bypass valve 62 (see FIG. 2). Similarly, a second fuel path 148 is defined from the low-pass ingress port 130 to the third egress port 140. Fuel from the second fuel path 148 flows to the primary stage vane 64 as a normal fluid signal to determine a routine pitch angle of the primary stage vane 64. A third fuel path 150 is defined as a return path from the first inbound return port 132 to the first outbound return port 142. As such, when in the routine state, the spool valve 96 may further direct fuel from the primary stage vane 64 back to the PGV valve 76. Moreover, when in the routine state, fuel into the second high-pass ingress 128 and fuel into the second inbound return port 134 may be substantially reduced or completely blocked by the spool valve 96.

Returning now to FIG. 3, an exemplary overspeed protection system 62 is illustrated in an overspeed state. Except where otherwise indicated, the flow of fuel through the system 62 in the overspeed state may be considered substantially similar to the above-described flow in the routine state. Generally, the overspeed state is initiated upon determination of an overspeed condition. As noted above, the overspeed condition may be determined by the controller 100 using one or more sensors (not pictured). Once an overspeed condition is determined, the system 62 may transition to the overspeed state. In turn, the system 62 positions the primary stage vane 64 at a pitch angle wherein air to the gas turbine engine is substantially reduced and/or blocked, i.e., an airflow-inhibiting position. The primary stage vane 64 may further be secured in that position to, e.g., continuously deflect air away from an engine core inlet 20 (see FIG. 1) while the overspeed condition persists.

In some embodiments of the overspeed state, fuel flowing from the low-pass input line 102 to the OS positional valve 94 is at least partially directed to the spool valve 96. If some fuel flows to the spool valve 96 from the overspeed positional valve 94 in the routine state, that flow may be increased at the overspeed state. Optionally, the controller 100 may send an electronic signal to the OS positional valve 94 to increase flow through the actuator signal line 106 and move the spool valve 96 into an overspeed state position. Once the spool valve 96 reaches its overspeed state, excess fuel may be directed to a system return line 108 to recirculate through the pump 74.

Fuel flowing from the high-pass input line 104 passes through the spool valve 96 before being directed primarily, or entirely, to the primary stage vane 64. In turn, fuel flow to the bypass valve 82 and combustion line 98 is substantially restricted or stopped. The high-pass flow of fuel to the primary stage vane 64 rapidly pivots the primary stage vane 64 to a predetermined overspeed pitch angle. The predetermined pitch angle may be configured to significantly or fully restrict air through the core engine 14 (see FIG. 1). For example, the predetermined overspeed pitch angle may be a maximum pitch angle of the primary stage vane 64. Upon pivoting or positioning the primary stage vane 64, fuel pressure reaches a maximum limit set by a pump relief valve 75 which opens and ports pump flow back to the inlet of the pump 74, maintaining maximum pressure on the vane stage 64. The subsequent recirculation of fuel through the pump relief valve 75 will secure and hold the primary stage vane 64 in its predetermined overspeed pitch angle.

Figure 5:
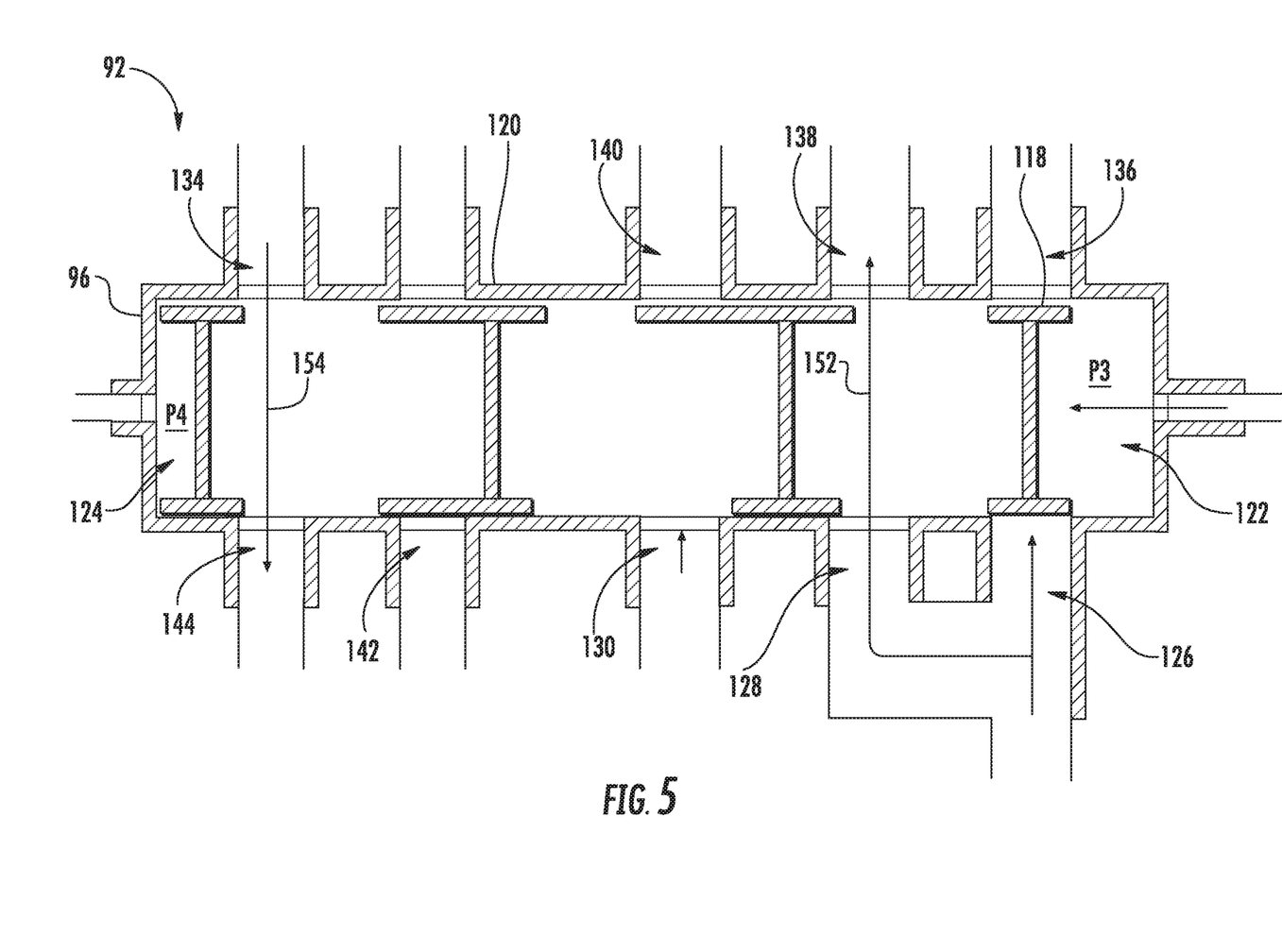
FIG. 5 provides a cross-sectional schematic view of the exemplary overspeed valve of FIG. 4 in an overspeed state.

FIG. 5 provides an exemplary cross-sectional view of the spool valve 96 during an overspeed state. As shown, an overspeed-state drive pressure P3 is supplied to first chamber 122 from the OS positional valve 94 (see FIG. 3), while a corresponding overspeed-state response pressure P4 is reached in the second chamber 124. In the illustrated embodiment, an equalizing line in fluid communication with a system return line 108 (see FIG. 3) allows fluid communication therebetween. As described above, additional or alternative embodiments of the second chamber 124 may include a biasing member to provide a predetermined response force or pressure in reaction to pressure from the OS positional valve 94.

In the overspeed state, spool 118 is slidably repositioned from the routine state position (FIG. 4) such that the casing 120 and spool 118 define multiple alternate fluid paths. During the overspeed state, the paths may reroute fuel through the spool valve 96 to actuate the primary stage vane 64 while simultaneously shutting off fuel flow to a combustion section 26 (see FIG. 1) of the engine. For instance, in the overspeed state of FIG. 5, a first alternate fuel path 152 extends from the second high-pass ingress port 128 to the second egress port 138 to rapidly direct fuel to the rotary actuator 68 of the primary stage vane 64 (see FIG. 3). An alternate return path 154 is defined from the second inbound return port 134 to the second outbound return port 144. As such, when in the overspeed state, the spool valve 96 may guide fuel from the primary stage vane 64 directly to the system return line 108 (see FIG. 3). As a result, fuel from the first egress port 136 and the third egress port 140, as well as the first outbound return port 142, may be effectively and/or substantially blocked by the spool valve 96 when in the overspeed state. Moreover, as shown, rerouting the hydraulic fluid overrides a normal fluid signal to the primary stage vane 64 (i.e., fluid signal at the second fuel path 148 in FIG. 4). During the overspeed state, the pump 74 may recirculate fuel through the control circuit 72 (e.g., along the path 152 through the spool valve 96) and cycle the flow through the primary stage vane 64 to secure the primary stage vane 64 in an air-inhibiting position.

Figure 6:
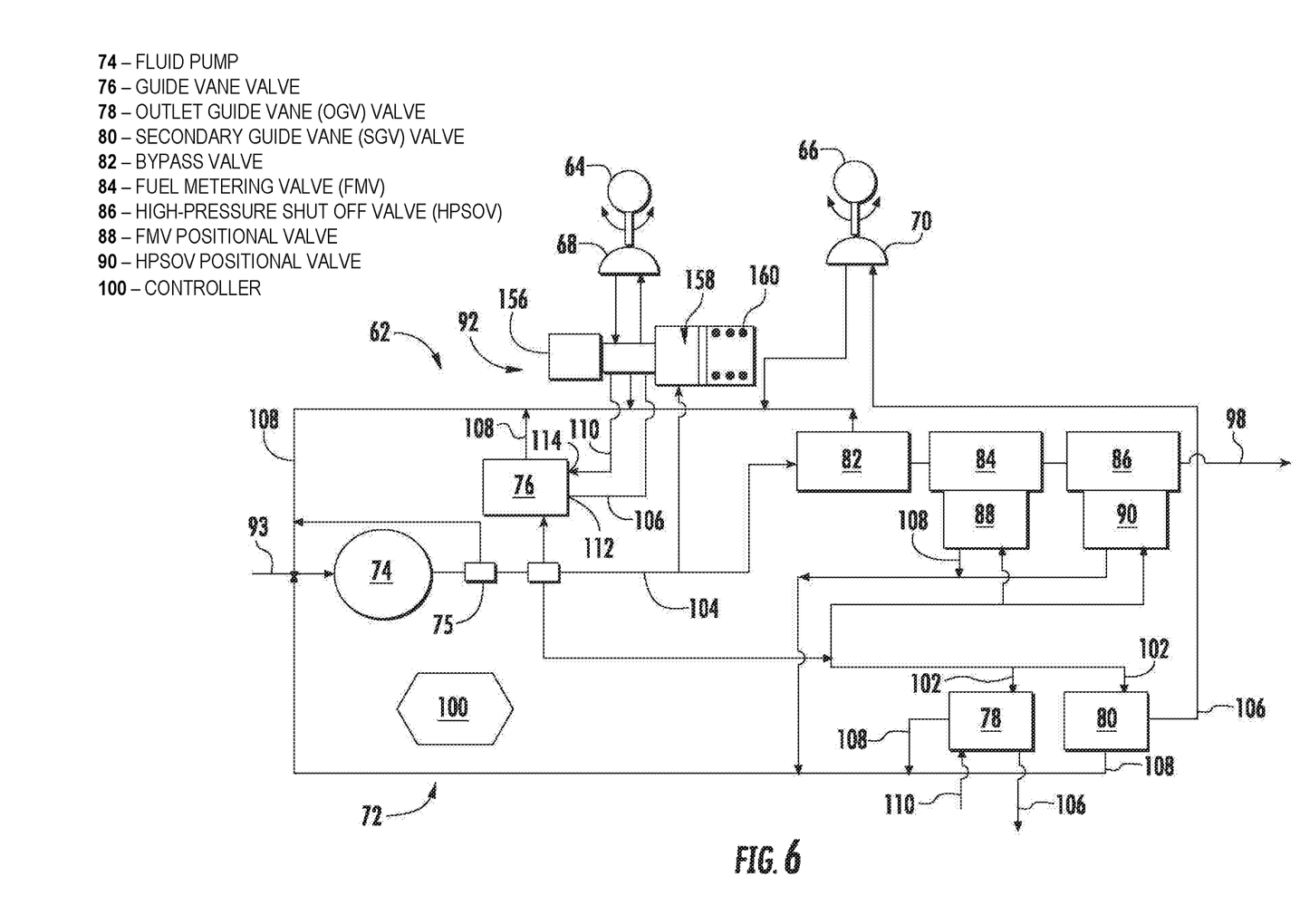
FIG. 6 provides a schematic flow diagram view of another exemplary overspeed protection system in accordance with one or more embodiments of the present disclosure.

Turning to FIG. 6, a flow diagram is provided of a control circuit 72 according to another exemplary embodiment of the present disclosure. Except where otherwise indicated, the illustrated embodiment may be considered substantially similar to the above-described flow embodiment of FIGS. 2 and 3. For instance, the exemplary embodiment of FIG. 6 includes a pump 74 selectively directing fuel to a bypass valve 82, fuel metering valve 84, and high-pressure shut off valve 86. Moreover, the exemplary embodiment of FIG. 6 includes a controller 100 in operable communication and/or electronically linked with one or more positional valves 76, 78, 80, 88, 90.

As shown, the overspeed valve 92 of FIG. 6 includes an accumulator valve 156. At a routine state, fuel passes into a fluid reserve 158 until a maximum fuel volume is reached. Excess fuel is directed to a system return line 108. During a routine state, fuel flows through the accumulator valve 156 between the primary stage vane 64 and PGV valve 76. However, during an overspeed state, fuel within the fluid reserve 158 is rapidly released to the primary stage vane 64. A biasing member 160, e.g., spring, may be included in the accumulator valve 156 and held under tension during the routine state. Transitioning to the overspeed state may require releasing the biasing member to thereby force fuel from the fluid reserve 158. Optionally, the release may be initiated by an electronic signal to the accumulator valve 156 from the controller 100. In the overspeed state, the accumulator valve 156 substantially restricts any fuel flow to PGV valve 76 from the primary stage vane 64. Flow to the combustion line 98 may be restricted at the flow metering valve 84 and/or high-pressure shut off valve 86. In turn, fuel flowing to the bypass valve 82 may be substantially or entirely directed to a system return line 108 and recirculated by the pump 74.

Figure 7:
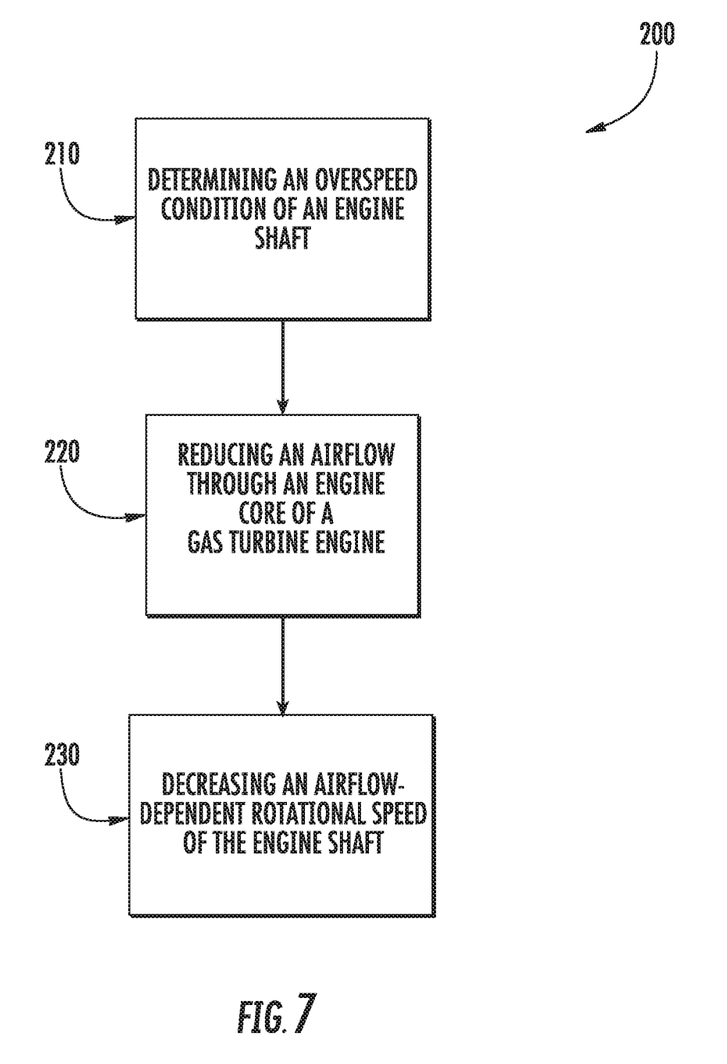
FIG. 7 provides a flow chart illustrating a method of overspeed protection in accordance with one or more embodiments of the present disclosure.
Figure 8:
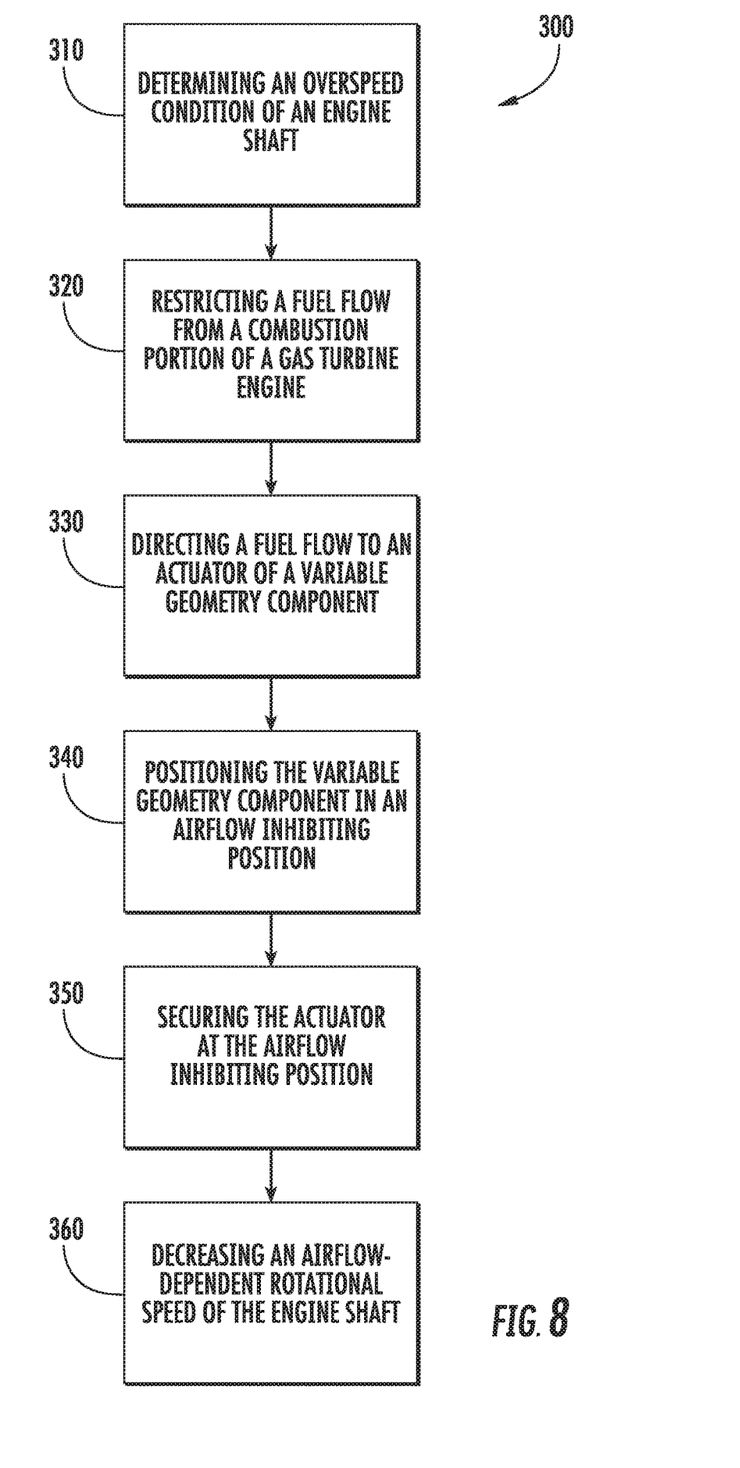
FIG. 8 provides a flow chart illustrating a method of overspeed protection in accordance with additional or alternative embodiments of the present disclosure.

FIGS. 7 and 8 depict flow diagrams of exemplary methods (200) and (300), respectively, according to example embodiments of the present disclosure. The methods (200) and (300) may be implemented using one or more of the exemplary systems of FIGS. 2 through 6. Accordingly, the methods (200) and (300) can be performed, for instance, by the controller 100 to protect an engine shaft (e.g., LP drive shaft or HP drive shaft) of a gas turbine engine during overspeed conditions. FIGS. 7 and 8 depict steps performed in a particular order for purpose of illustration and discussion. It should be appreciated, however, that certain steps of any of the methods disclosed herein can be modified, adapted, rearranged, omitted, or expanded in various ways without deviating from the scope of the present disclosure.

Turning to FIG. 7, the method (200) is illustrated for overspeed protection of an engine shaft in a gas turbine engine. At (210), the method includes determining an overspeed condition of the engine shaft. The overspeed condition may the overspeed condition may be indicative of an above normal rotational speed of the engine shaft. Moreover, the overspeed condition may be determined, for example, from detection signals received by one or more sensors detecting rotational speed of the engine shaft wherein the engine shaft includes a drive shaft such as an LP shaft of a low-pressure turbine or an HP shaft of a high-pressure turbine. Determining an overspeed condition may, optionally, cause a signal to be transmitted to an overspeed valve in fluid communication with a variable geometry component. Specifically, in some embodiments, the signal may be transmitted to an OS positional valve to toggle the overspeed valve from a routine state to an overspeed state.

At (220), the method includes reducing an airflow through an engine core of the gas turbine engine in response to the determined overspeed condition. Optionally, the reducing airflow may be in reaction to the overspeed valve reaching an overspeed state. In some embodiments, (220) includes positioning the variable geometry component in a predetermined radial pitch angle. For instance, positioning a variable geometry component may reduce an effective cross section area of a flowpath in which the variable geometry component is positioned. The variable geometry component may include a fan blade or an inlet guide vane, as described above.

In certain embodiments, (220) includes rerouting a hydraulic fluid through a spool valve to the variable geometry component. In further embodiments, rerouting the hydraulic fluid overrides a normal fluid signal to the variable geometry component. In still further embodiments, the hydraulic fluid includes a fuel from an engine fuel pump. In additional or alternative embodiments, (220) includes rapidly releasing a hydraulic fluid to the variable geometry component from a fluid accumulator valve.

In optional embodiments, (220) includes securing the variable geometry component by securing an actuator of the variable geometry component to maintain the reduced effective cross section area of a flowpath in which the variable geometry component is positioned. As described above, the variable guide valve may be maintained at a predetermined maximum pitch angle. In certain embodiments, securing the actuator of the variable geometry component includes cycling the hydraulic fluid through a portion of the control circuit, the aforementioned pump relief valve. Moreover, the variable geometry component may be effectively held at a maximum pitch angle by the circulation of hydraulic fluid through the relief valve around the high pressure pump.

At (230), the method (200) includes decreasing an airflow-dependent rotational speed of the engine shaft. In some embodiments, (230) may be caused by (220). The reduced rotational speed may prevent or reduce further damage to the engine shaft or engine during an overspeed condition. Advantageously, the method may allow the speed to be reduced without requiring substantial additions of rotating mass. Moreover, the method may restrict further combustion from occurring, thus preventing the generation of combustion gases to motivate the engine turbines.

Turning to FIG. 8, the method (300) is illustrated for overspeed protection of an engine shaft in a gas turbine engine. At (310), the method includes determining an overspeed condition at an engine shaft. The overspeed condition may be determined, for example, from detection signals received by one or more sensors detecting rotational speed of the engine shaft. Determining an overspeed condition may, optionally, cause a signal to be transmitted to an overspeed valve in fluid communication with an actuator of a variable geometry component. Specifically, in some embodiments, the signal may be transmitted to an OS positional valve to toggle the overspeed valve from a routine state to an overspeed state.

At (320), the method (300) includes restricting a fuel flow from a combustion section of the gas turbine engine in response to the overspeed condition. The fuel flow may be restricted, for example, by one or more valves in operable communication with the controller. Optionally, the controller may transmit an electronic signal to a fuel governing valve directing the fuel governing valve to close or cease flow therethrough. Fuel flow restricted from the combustion section of the engine may be redirected to the pump through, for example, a bypass line.

At (330), the method (300) includes directing a fuel flow to an actuator of a variable geometry component in response to the determined overspeed condition. In certain embodiments, (330) includes directing all or some of the fuel flow through a spool valve to the actuator of the variable geometry component. In further embodiments, directing the fuel flow overrides a normal fluid signal to the variable geometry component. In additional or alternative embodiments, (330) includes rapidly releasing a stored amount of fuel to the actuator of the variable geometry component from a fluid accumulator valve. The fuel flow may be the fuel flow restricted at (320). Thus, (330) may optionally be performed simultaneously with (320). Alternatively, (320) and (330) may occur at discrete and/or sequential time periods according to one or more predetermined requirement.

At (340), the method (300) includes, positioning a variable geometry component in an airflow inhibiting position with the actuator to reduce a rotational speed of the engine shaft. As described above, positioning the variable geometry component may include moving the variable geometry component to a predetermined radial pitch angle. The move may include pivoting the variable geometry component with an actuator. Optionally, the predetermined pitch angle may be a maximum pitch angle. In certain embodiments, the variable geometry component includes a fan blade for an engine fan or an inlet guide vane, as described above.

At (350), the method (300) includes securing the actuator at the airflow inhibiting position of the variable geometry component. As described above, the variable geometry component may be maintained at a predetermined maximum pitch angle. In some such embodiments, (350) includes cycling the hydraulic fluid through a portion of the control circuit. In such embodiments, the cycled portion of the control circuit may include an actuator of the variable geometry component. Moreover, the variable geometry component may be effectively held at a maximum pitch angle by the circulation of hydraulic fluid across the pressure relief valve and return to the inlet of the high pressure fuel pump.

At (360), the method (300) includes decreasing an airflow-dependent rotational speed of the engine shaft. The reduced rotational speed may prevent or reduce further damage to the engine shaft or engine during an overspeed condition. Advantageously, the method may allow the speed to be reduced without requiring substantial additions of rotating mass. Moreover, the method may restrict further combustion from occurring, thus preventing the generation of combustion gases to motivate the engine turbines.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for providing overspeed protection for a gas turbine engine, the gas turbine engine comprising an engine core, an engine shaft, and a spool valve, the method comprising:
   determining an overspeed condition of the gas turbine engine; and
   reducing an airflow through the engine core of the gas turbine engine in response to the determined overspeed condition to reduce a rotational speed of the engine shaft,
   wherein the gas turbine engine defines a flowpath and comprises a variable geometry component positioned in the flowpath, the variable geometry component comprising an actuator,
   wherein reducing the airflow through the engine core in response to the determined overspeed condition includes positioning the variable geometry component to reduce an effective cross sectional area of the flowpath in response to the determined overspeed condition, which includes rerouting a hydraulic fluid through the spool valve to the actuator of the variable geometry component in response to the determined overspeed condition, and
   wherein rerouting the hydraulic fluid through the spool valve includes moving the spool valve from a routine state position in which the hydraulic fluid from an inlet is supplied to a first outlet that is open and that is connected to a combustion line to an overspeed state position in which the first outlet is closed and the hydraulic fluid from the inlet is supplied to a second outlet that is open and that is connected to the actuator of the variable geometry component.

2. The method of claim 1, wherein the variable geometry component is a fan blade of a fan of the gas turbine engine.

3. The method of claim 1, wherein the variable geometry component is a guide vane.

4. The method of claim 1, wherein rerouting the hydraulic fluid includes overriding a fluid signal to the actuator of the variable geometry component.

5. The method of claim 1,
   wherein the gas turbine engine comprises an engine fuel pump, and
   wherein the hydraulic fluid includes a fuel from the engine fuel pump.

6. The method of claim 1, wherein reducing the airflow through the gas turbine engine core further includes securing the actuator of the variable geometry component to maintain the reduced effective cross sectional area of the flowpath in which the variable geometry component is positioned.

7. The method of claim 6,
   wherein the gas turbine engine comprises a control circuit for porting the hydraulic fluid to the variable geometry component, and
   wherein securing the actuator includes cycling the hydraulic fluid through a portion of the control circuit.

8. A method for providing overspeed protection for a gas turbine engine, the gas turbine engine comprising an engine shaft, a spool valve, a combustion section, and a variable geometry component comprising an actuator, the method comprising:
   determining an overspeed condition of the engine shaft;
   restricting a fuel flow from the combustion section of the gas turbine engine in response to the overspeed condition;
   directing the fuel flow to the actuator of the variable geometry component in response to the determined overspeed condition; and
   positioning the variable geometry component in an airflow inhibiting position with the actuator to reduce a rotational speed of the engine shaft in response to the determined overspeed condition, which includes rerouting a hydraulic fluid through the spool valve to the actuator of the variable geometry component in response to the determined overspeed condition,
   wherein rerouting the hydraulic fluid through the spool valve includes moving the spool valve from a routine state position in which the hydraulic fluid from an inlet is supplied to a first outlet connected to the combustion section to an overspeed state position in which the first outlet is closed and the hydraulic fluid from the inlet is supplied to a second outlet connected to the actuator of the variable geometry component,
   wherein the gas turbine engine defines a flowpath, and
   wherein positioning the variable geometry component in the airflow inhibiting position includes reducing an effective cross sectional area of the flowpath.

9. The method of claim 8, wherein the variable geometry component includes a fan of the gas turbine engine.

10. The method of claim 8, wherein the variable geometry component includes an inlet guide vane.

11. The method of claim 8, wherein directing the fuel flow includes directing the fuel flow through the spool valve to the actuator of the variable geometry component.

12. The method of claim 8, further comprising securing the actuator at the airflow inhibiting position of the variable geometry component,
   wherein securing the actuator at the airflow inhibiting position includes cycling a hydraulic fluid through a portion of a control circuit, the hydraulic fluid including the fuel flow.

* * * * *